United States Patent

Hendi et al.

[11] Patent Number: 5,472,496
[45] Date of Patent: Dec. 5, 1995

[54] SOLID SOLUTIONS OF PYRROLO-[3.4-C]-PYRROLES WITH QUINACRIDONEQUINONES

[75] Inventors: Shivakumar B. Hendi, Newark; Lindsay Kilmurry; Edward E. Jaffe, both of Wilmington, all of Del.

[73] Assignee: Ciba-Geigy Corporation, Tarrytown, N.Y.

[21] Appl. No.: 289,167

[22] Filed: Aug. 11, 1994

[51] Int. Cl.⁶ .................................................. C09B 67/22
[52] U.S. Cl. ........................... 106/495; 106/494; 106/497; 106/498
[58] Field of Search ................................ 106/494, 495, 106/497, 498; 546/167

[56] References Cited

U.S. PATENT DOCUMENTS

| | | | |
|---|---|---|---|
| 3,686,009 | 8/1972 | West | 106/495 |
| 3,748,162 | 7/1973 | West | 106/495 |
| 4,286,998 | 9/1981 | Höltje et al. | 106/480 |
| 4,415,685 | 11/1983 | Iqbal et al. | 524/92 |
| 4,579,949 | 4/1986 | Rochat et al. | 546/167 |
| 4,810,304 | 3/1989 | Jaffe et al. | 106/494 |
| 4,881,980 | 11/1989 | Dietz et al. | 106/495 |

*Primary Examiner*—Helene Klemanski
*Assistant Examiner*—Scott L. Hertzog
*Attorney, Agent, or Firm*—George R. Dohmann

[57] ABSTRACT

The present invention relates to novel solid solutions which comprise a quinacridonequinone component, a pyrrolo[3,4-c]pyrrole component and a third component which is a 2-anilinoacridone, a 5,6,7,8-tetrahydro-2-anilinoacridone, 2-phenoxyacridone, a 5,6,7,8-tetrahydro-2-phenoxyacridone or a mixture thereof. The solid solutions are three component solid solutions which consist of the components identified above or are four component solid solutions which additionally contain a quinacridone component. Pigment compositions containing the disclosed solid solutions and a method of pigmenting high molecular weight organic material with the solid solutions are also disclosed.

27 Claims, No Drawings

SOLID SOLUTIONS OF PYRROLO-[3.4-C]-PYRROLES WITH QUINACRIDONEQUINONES

SUMMARY

The invention relates to a new series of pyrrolo[3,4-c] pyrrole and quinacridonequinone solid solution pigments in the gold and maroon color range. The pigmentary solid solutions possess high saturation and very good light and weatherfastness properties. The new solid solutions are useful as colorants in plastics, high quality inks and automotive paints; especially those with metallic effects.

BACKGROUND

The quinacridonequinones are known to form solid solutions with quinacridones. These solid solutions are maroon-colored pigments with good weathering fastness properties. However, due to the blueish-red color of the quinacridone component, it is not possible to retain the intense yellow color of the quinacridonequinone component.

The use of solid solutions containing quinacridonequinone and anilinoacridones as a pigment has been described in U.S. Pat. No. 4,286,998.

Binary solid solutions containing a quinacridone and/or quinacridonequinone component and a pyrrolo[3,4-c]pyrrole component, without an anilinoacridone or phenoxyacridone component, are described in U.S. Pat. No. 4,810,304. This publication provides a general suggestion that the addition of light-stabilizers, including anilinoacridones, before, during or after formation of the solid solution, may improve the lightfastness of the disclosed solid solutions. The publication does not suggest that the anilinoacridone could or should be incorporated into the crystal lattice of the solid solution to form a ternary solid solution.

The present invention relates to ternary solid solutions containing a quinacridonequinone component, a pyrrolo[3,4-c]pyrrole component and a third component which is a 2-anilinoacridone, a 5,6,7,8-tetrahydro-2-anilinoacridone, a 2-phenoxyacridone, a 5,6,7,8-tetrahydro-2-phenoxyacridone or a mixture thereof. The present ternary solid solutions show a great degree of improvement in lightfastness over binary solid solutions containing only the quinacridonequinone component and the pyrrolo[3,4-c]pyrrole component, and yet show the full range of attractive shades that the binary solid solutions display.

Another aspect of this invention relates to quaternary solid solutions containing the quinacridonequinone component, the pyrrolo[3,4-c]pyrrole component, the third acridone component and a quinacridone component. These quaternary solid solutions are attractive maroon pigments with excellent saturation, color strength and durability properties.

It is necessary to incorporate the photostabilizing acridone component into the solid solution in order to acheive the superior photostability found in both the ternary and quaternary solid solutions of the present invention. Thus, the present solid solutions demonstrate surprisingly superior photostability when compared to a physical mixture containing the acridone component and a preformed solid solution of only the quinacridonequinone component and the pyrrolo[3,4-c]pyrrole component.

DETAILED DESCRIPTION

The present invention relates to solid solutions consisting of from 50 to 97 weight-percent of a quinacridonequinone component, from 2 to 30 weight-percent of a pyrrolo[3,4-c]pyrrole component and from 1 to 20 weight-percent of a third component which is a 2-anilinoacridone, a 5,6,7,8-tetrahydro-2-anilinoacridone, 2-phenoxyacridone, a 5,6,7,8-tetrahydro-2-phenoxyacridone or a mixture thereof.

In general, the solid solutions are ternary or three component solid solutions wherein only a single compound is used as the third component. However, the expression "ternary solid solution" is intended to include those solid solutions wherein the third component is a mixture of more than one acridone and/or tetrahydroacridone component which is incorporated into the solid solution crystal lattice.

The quinacridonequinone component is a compound of the formula

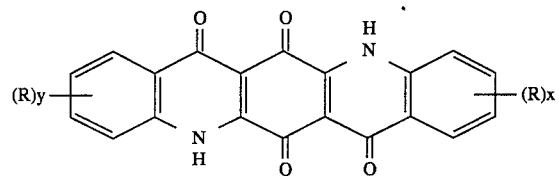

in which R is hydrogen, halogen, or $C_1$–$C_4$alkyl, and x and y are independently 1 or 2. The quinacridonequinone compounds are well-known in the an as components of pigments and can be prepared, for example, by processes described in U.S. Patent Nos. 3,124,582, 3,185,694 and 3,251,845.

Compounds that are especially useful as the quinacridonequinone component include unsubstituted quinacridonequinone, 2,9-dichloroquinacridonequinone and 2,9-dimethylquinacridonequinone.

The pyrrolo[3,4-c]pyrrole component is a compound of the formula

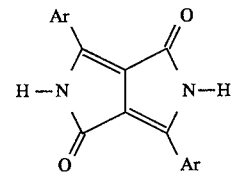

in which each Ar is independently an aryl substituent of the formula

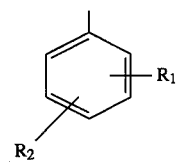

wherein $R_1$ and $R_2$ are independently of each other hydrogen, halogen, $C_1$–$C_5$-alkyl $C_1$–$C_5$alkoxy, —$SR_3$, —$N(C_1$–$C_5$alkyl), —$CF_3$, —CN or a substituent of the formula

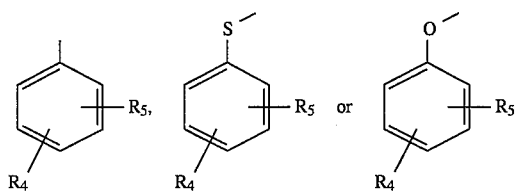
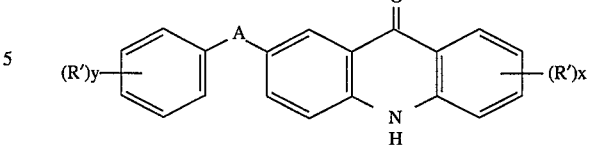

wherein $R_3$ is $C_1-C_5$alkyl and $R_4$ and $R_5$ are independently of each other hydrogen, halogen, $C_1-C_5$-alkyl, $C_1-C_5$-alkoxy, —$SR_3$ or —CN. The pyrrolo[3,4-c]pyrroles are known in the art as pigments and are described in U.S. Pat. No. 4,415,685. A process which is useful for preparing the pyrrolo[3,4-c]pyrroles is described in U.S. Pat. No. 4,579,949.

Compounds that are particularly useful as the pyrrolo[3,4-c]pyrrole component include various disubstituted derivatives, such as the 3,6-bis(4-chlorophenyl), 3,6-bis(4-methylphenyl), 3,6-bis(3-chlorophenyl), 3,6-bis(3-methylphenyl) and 3,6-bis(biphenylyl) derivatives, and the unsubstituted compound, 1,4-diketo-3,6-diphenylpyrrolo-[3,4-c]-pyrrole (DPP).

The third component is a 2-anilinoacridone or 2-phenoxyacridone of the formula

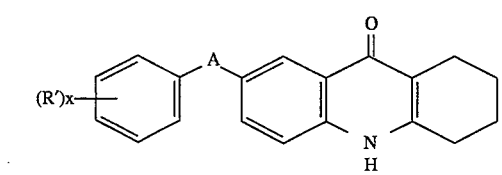

or a 5,6,7,8-tetrahydro-2-anilinoacridone or 5,6,7,8-tetrahydro-2-phenoxyacridone of the formula

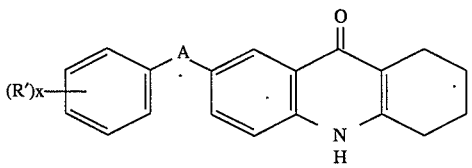

wherein A is O or NH, and R' is hydrogen, halogen or $C_1-C_4$alkyl.

The 5,6,7,8-tetrahydro-2-anilinoacridones are prepared by condensing a 2-cyclohexanonecarboxylate ester with a N-phenyl-p-phenylenediamine and cyclizing the resulting 2-{4'-(phenylamino)phenyl}-aminocyclohexenecarboxylate ester by heating in an inert, high-boiling liquid. The 2-anilinoacridone is prepared by dehydrogenating the 5,6,7,8-tetrahydro-2-anilinoacridone using a supported palladium or platinum catalyst. The preparation of the 5,6,7,8-tetrahydro-2-anilinoacridones and 2-anilinoacridones is described in U.S. Pat. No. 4,286,998.

The 5,6,7,8-tetrahydro-2-phenoxyacridones and 2-phenoxyacridones are known and are prepared by a similar process except that the N-phenyl-p-phenylenediamine is replaced with a 4-aminodiphenyl ether.

Compounds that are particularly useful as the third component include the unsubstituted compounds, particularly 2-anilinoacridone and 5,6,7,8-tetrahydro-2-anilinoacridone.

In one aspect, the claimed invention relates to ternary solid solutions wherein the third component is a 2-anilinoacridone of the formula wherein A is NH, especially 2-anilinoacridone.

Notable compositions containing 2-anilinoacridone as the third component are those wherein the R substituents of the quinacridonequinone component are hydrogen, chlorine or methyl, and x and y are 1, especially those wherein the Ar substituent of the pyrrolo[3,4-c]pyrrole component contains two aryl groups wherein $R_1$ and $R_2$ are hydrogen or chlorine, for example, wherein $R_1$ is a para-chloro substituent and $R_2$ is hydrogen. Especially notable are those compositions wherein the ternary solid solution contains unsubstituted quinacridonequinone, DPP and 2-anilinoacridone as the third component.

The claimed invention further relates to the ternary solid solution wherein the third component is a 5,6,7,8-tetrahydro-2-anilinoacridone of the formula wherein A is NH, especially the unsubstituted compound, 5,6,7,8-tetrahydro-2-anilinoacridone. Notable compositions containing 5,6,7,8-tetrahydro-2-anilinoacridone as the third component are those wherein the R substituents of the quinacridonequinone component are hydrogen, chlorine or methyl, and x and y are 1, especially those wherein the Ar substituent of the pyrrolo[3,4-c]pyrrole component contains two phenyl groups wherein $R_1$ and $R_2$ are hydrogen or chlorine, or wherein $R_1$ is a para-chloro substituent and $R_2$ is hydrogen. Especially notable are those compositions wherein the ternary solid solution contains unsubstituted quinacridonequinone, DPP and 5,6,7,8-tetrahydro-2-anilinoacridone as the third component.

The present invention also relates to the ternary solid solution which contains a third component wherein A is oxygen, for example, 2-phenoxyacridone or 5,6,7,8-tetrahydro-2-2-phenoxyacridone. Notable compositions containing 2-phenoxyacridone or 5,6,7,8-tetrahydro-2-phenoxyacridone as the third component are those wherein the R substituents of the quinacridonequinone component are hydrogen, chlorine or methyl, and x and y are 1, especially those wherein the Ar substituent of the pyrrolo[3,4-c]pyrrole component contains two phenyl groups wherein R1 and $R_2$ are hydrogen or chloro, or wherein $R_1$ is a para-chloro substituent and $R_2$ is hydrogen. Especially notable are those compositions wherein the ternary solid solution contains unsubstituted quinacridonequinone, 1,4-diketo-3,6-diphenylpyrrolo-[ 3,4-c]-pyrrole and 2-phenoxyacridone or 5,6,7,8-tetrahydro-2-phenoxyacridone as the third component.

In an embodiment of this invention, the ternary solid solution contains from 65 to 80 weight-percent of the quinacridonequinone component and from 10 to 25 weight-percent of the pyrrolo[3,4-c]pyrrole component; the remainder being the third component, in particular, ternary solid solutions containing from 70 to 80 weight-percent of the quinacridonequinone component and from 15 to 20 weight-percent of the pyrrolo[3,4-c]pyrrole component. In a more specific embodiment, the ternary solid solution contains 74 to 78 weight-percent of the quinacridonequinone component and from 18.5 to 19.5 weight-percent of the pyrrolo[3,4-c] pyrrole component; the remainder being the third component.

In general, the ternary solid solutions of the present invention are guest-host solid solutions with the x-ray diffraction pattern of the quinacridonequinone, the host molecule. Normally, it is possible to incorporate up to about 30 weight-percent of the pyrrolo[3,4-c]pyrrole component into the quinacridonequinone crystal lattice in the presence of the third component. Generally, it is possible to incorporate up to 20 weight-percent, preferably up to 14 weight-percent, of the third component into the quinacridonequinone crystal lattice as part of the ternary solid solution.

This invention further relates to pigment compositions which contain the ternary solid solution. The pigment compositions are normally mixtures which comprise the ternary solid solution and an excess of one or more of the components of the solid solution, especially an excess of the pyrrolo[3,4-c]pyrrole component. In addition, the pigment compositions of the present invention include compositions which contain the ternary solid solution and additional ingredients such as texture improving agents, antiflocculating agents or viscosity-modifying agents.

Any texture improving agent is suitable as an additional component of the present pigment compositions; the calcium salt of abietic acid being particularly suitable.

Quinacridone sulfonic acid or its salts, DPP sulfonic acid and its salts, pyrazolylmethylquinacridone, 2-phthalimidomethylquinacridone and other similar derivatives are suitable as additive antiflocculating agents.

Suitable viscosity-modifying agents include quinacridone sulfonic acids, diketopyrrolopyrrole sulfonic acids, a pyrazolylmethylquinacridone, a pyrazolylmethyldiketopyrrolopyrrole, a dimethylaminopropylquinacridone monosulfonamide, a dimethylaminopropylquinacridone disulfonamide, a phthalimidomethylquinacridone, and salts and mixtures thereof.

In addition to the ternary solid solutions discussed above, this invention further relates to quaternary solid solutions which contain a quinacridone component in addition to the three components in the ternary solid solutions. Thus, the present invention also relates to a quaternary solid solution consisting of from 40 to 96 weight-percent of a quinacridonequinone component, from 1 to 45 weight-percent of a quinacridone component, from 2 to 30 weight-percent of a pyrrolo[3,4-c]pyrrole component and from 1 to 20 weight-percent of an acridone component which is a 2-anilinoacridone, a 5,6,7,8-tetrahydro-2-anilinoacridone, 2-phenoxyacridone component, a 5,6,7,8-tetrahydro-2-phenoxyacridone or a mixture thereof; wherein the quinacridonequinone component is a compound of the formula

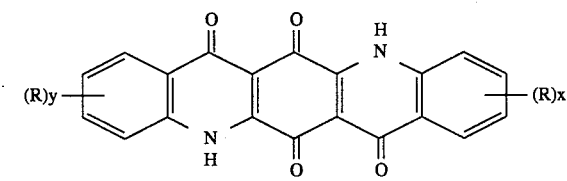

in which R is hydrogen, halogen, or $C_1$–$C_4$alkyl, and x and y are independently 1 or 2; wherein the quinacridone component is a compound of the formula

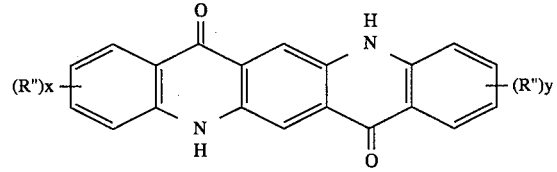

wherein each R" is independently hydrogen, halogen, $C_1$–$C_4$alkyl or trifluoromethyl; the pyrrolo[3,4-c]pyrrole component is a compound of the formula

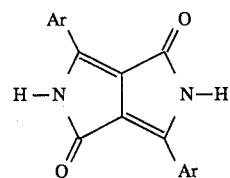

in which each Ar is independently an aryl substituent of the formula

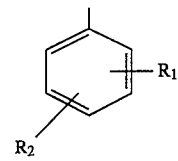

wherein $R_1$ and $R_2$ are independently of each other hydrogen, halogen, $C_1$–$C_5$-alkyl, $C_1$–$C_5$-alkoxy, —$SR_3$, —$N(C_1$–$C_5$alkyl$)_2$, —$CF_3$, —CN or a substituent of the formula

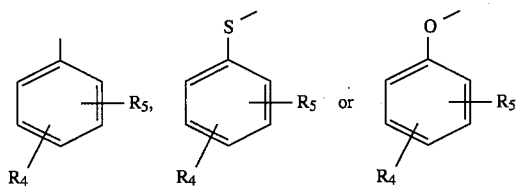

wherein $R_3$ is $C_1$–$C_5$alkyl and $R_4$ and $R_5$ are independently of each other hydrogen, halogen, $C_1$–$C_5$-alkyl, $C_1$–$C_5$-alkoxy, —$SR_3$ or —CN, wherein $R_3$ is $C_1$–$C_5$alkyl; and wherein the acridone component is a compound of the formula

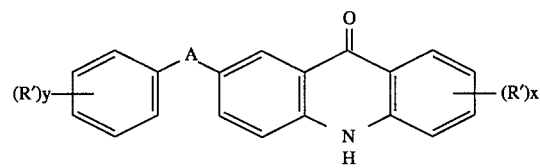

or a compound of the formula

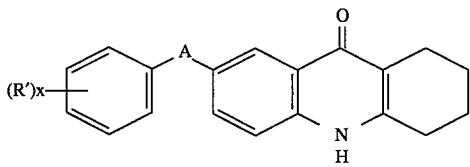

wherein A is O or NH and R' is hydrogen, halogen or $C_1$–$C_4$alkyl.

Especially suitable quaternary solid solutions are those wherein each R is hydrogen, chlorine or methyl, each R" is hydrogen or chlorine, $R_1$ and $R_2$ are each hydrogen, each R' is hydrogen; especially those each R is hydrogen and each R" is hydrogen.

In general, the quaternary solid solutions described above are guest-host solid solutions with the x-ray diffraction pattern of the host, the quinacridonequinone.

In an embodiment of this invention, the quaternary solid solution contains from 40 to 60 weight-percent of the quinacridonequinone component, from 20 to 40 weight percent of the quinacridone component and from 10 to 25 weight-percent of the pyrrolo[3,4-c]pyrrole component; the remainder being the acridone component, in particular, quaternary solid solutions containing from 40 to 50 weight-percent of the quinacridonequinone component, from 30 to 40 weight-percent of the quinacridone component and from 10 to 20 weight-percent of the pyrrolo[3,4-c]pyrrole component.

This invention also embraces pigmentary compositions comprising the quaternary solid solutions described above. In general, the pigment compositions are mixtures which contain an excess of one of the components out of solid solution. Preferably, the pyrrolo[3,4-c]pyrrole component is the excess component. In addition, the pigment compositions contain the additional ingredients described above for the pigment compositions of the ternary solid solutions.

It is preferred to use from about 3 to about 15 weight-percent of the third or acridone component in both the ternary and quaternary solid solutions. In general, increasing levels of the third or acridone component increase the photostability of the solid solution. However, the photostabilizing effect levels off at about 7 to 10 weight-percent.

Solid solutions containing 5,6,7,8-tetrahydro-2-anilinoacridones as the third or acridone component show especially good color saturation and rheology properties.

The present solid solutions and pigment compositions are prepared starting from the above-identified components by general procedures used in the art to prepare solid solutions, for example, by acid precipitation or by milling a mixture of the components.

To prepare the solid solutions by acid precipitation, the components of the solid solution are dissolved in an acid, generally a concentrated acid, for example, concentrated sulfuric acid or polyphosphoric acid. The solid solution is then precipitated by dilution with water or another suitable precipitating solvent. The solid solution obtained by this route is generally highly aggregated and very small in particle size. Therefore, solid solutions prepared by acid precipitation are often recrystallized, for example, by heating the aqueous acid suspension of the pigment in the presence or absence of an organic solvent. The pigments prepared by acid precipitation are optionally further subjected to a crystal growth step, which is promoted by a variety of surfactants and/or organic solvents according to procedures known in the pigment art.

Milling methods are also used to prepare the present solid solutions, optionally with subsequent crystallization in water and/or solvents by methods known in the art. Milling methods which utilize dry salt as a milling medium, with or without small amounts of organic solvents, are favored. In addition, milling aids, for example, metal, glass or ceramic balls, plastic granules or sand grains are usually utilized. The dry salts used in the grinding include sodium chloride, calcium chloride, sodium sulfate or aluminum sulfate with or without water of crystallization. For example, for every 10 parts of a mixture of the solid solution components, 40 parts of hydrated aluminum sulfate is used. Small amounts of a variety of solvents, such as high boiling hydrocarbons or dibasic esters, in particular dimethyl succinate and/or dimethyl glutarate, are optionally included in the milling recipe. Additionally, a surfactant is optionally added to the milling recipe. Useful surfactants include sodium or isopropylammonium salts of dodecylbenzenesulfonic acid or decyl trimethyl ammonium chloride. After the milling is complete the mixture is worked-up by separating the mixture of solid solution and salt from the milling aids, followed by a dilute acid extraction and isolation of the solid solution or composition by filtration.

The present invention further relates to a method of coloring a high molecular weight organic material which comprises incorporating an effective pigmenting amount of the above-described ternary or quaternary solid solutions and pigment compositions into the high molecular weight organic material. An effective pigmenting amount is generally an amount in the range from about 0.01 weight-percent to about 30 weight-percent. Suitable high molecular-weight organic compounds include for example, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

The following examples further illustrate, but do not limit, the present invention. All parts given are parts by weight.

Example 1

2-Anilinoacridone (1.7 g.; 0.006 mol.) and DPP (8.6 g.; 0.03 mol.) are added to a moderately stirred, 1000 ml round-bottom flask containing concentrated sulfuric acid (400 ml) keeping the temperature below 35° C. Quinacridonequinone (42.8 g.; 0.125 mol.) is then added maintaining the temperature at 35° C. The resulting solution is stirred for 0.5 hour and quinacridone (34.2 g.; 0.11 mol.) is then added. The entire reaction mass is then stirred for an additional hour. The solution is then poured into ice water as a thin stream with vigorous stirring. The resulting slurry is stirred at 70° C. for one hour, treated with a surfactant (Witconate P-1059; 3.5 g.) and subsequently is heated to 90° C. for 1 hour. The slurry is then filtered hot, washed with hot water until neutral and dried at 80° C.

The resulting maroon solid solution pigment has the x-ray pattern of the host molecule, quinacridonequinone, and good lightfastness.

Example 2

A solid solution pigment of 44/39/15/2 composition of quinacridonequinone/quinacridone/DPP/anilinoacridone is prepared according to the procedure described in Example 1; except the following amounts of the components are used.

| | | |
|---|---|---|
| Quinacridonequinone | 44.0 g; | 0.129 mol. |
| Quinacridone | 39.0 g; | 0.125 mol. |
| DPP | 15.0 g; | 0.052 mol. |
| 2-Anilinoacridone | 2.0 g; | 0.007 mol. |

The solid solution pigment exhibits an intense maroon color and has the x-ray pattern of quinacridonequinone and good lightfastness.

Example 3

2-Anilinoacridone (7.2 g.; 0.025mol.) and DPP (11.1 g.; 0.039mol.) are added to a moderately stirred, 1000 ml round-bottom flask containing concentrated sulfuric acid (400 ml), keeping the temperature below 40° C. Quinacridonequinone (45.4 g.; 0.133 mol.) is then added maintaining the same temperature. The resulting solution is stirred for 2.0 hours and then poured into ice water as a thin stream with vigorous stirring. The resulting pigment slurry is stirred at 70° C. for 0.5 hour. Then the slurry is heated to 90° C. and held for 1 hour, filtered hot, washed with hot water until neutral and dried at 80° C.

The solid solution pigment has the x-ray pattern of the host molecule, quinacridonequinone. In an aluminum flake or mica extended automotive paint system, the solid solution pigment is a saturated, transparent orange color with good lightfastness.

Example 4

Quinacridonequinone (8.0 g.), DPP (2.0 g.), 2-anilinoacridone (1.1 g.), dimethyl glutarate (1.0 g.) and aluminum sulfate ($Al_2(SO_4)_3.15-18\ H_2O$; 40.0 g.) are added to a 1000 ml ball mill containing steel balls (1500 g.; 1.2 cm diameter) and nails (150 g.; 3.0 cm length) as grinding media. The mill is tightly closed and rolled on a roller mill for 48 hours. The contents of the mill are then discharged and separated from the milling media. The mill powder thus obtained is stirred with 2% aqueous sulfuric acid (500 ml) for 2 hours at 90° C. The resulting pigment slurry is filtered, washed with hot water until neutral and free of salts and dried at 80° C.

The resulting solid solution pigment is a transparent orange color, displays good lightfastness and has the x-ray pattern of the host molecule, quinacridonequinone.

Example 5

Example 4 is repeated; except that the milling duration is 24 hours instead of 48 hours and 0.7 g of 2-anilinoacridone is used instead of 1.1 g. The resulting solid solution pigment has the quinacridonequinone x-ray pattern. In a high solids automotive paint system, the solid solution pigment exhibits high saturation, excellent two-tone effects and good lightfastness.

Example 6

(a) A solid solution containing 77.6 parts of quinacridonequinone, 19.4 parts of DPP and 3 parts of 2-anilinoacridone is prepared according to the procedure of Example 5.

(b) A solid solution containing 76 parts of quinacridonequinone, 19 parts of DPP and 5 parts of 2-anilinoacridone is prepared according to the procedure of Example 5.

(c) A solid solution containing 74.4 parts of quinacridonequinone, 18.6 parts of DPP and 7 parts of 2-anilinoacridone is prepared according to the procedure of Example 5.

By rubout the solid solution pigments of Example 6a, 6b, 6c and Example 5 show increasingly darker and more transparent masstones as the amount of 2-anilinoacridone is increased.

Example 7 a) Example 5 is repeated using 0.6 g of 2-anilinoacridone instead of 0.7 g.

b) Example 5 is repeated using 0.8 g of 2-anilinoacridone instead of 0.7 g.

c) Example 5 is repeated using 1.0 g of 2-anilinoacridone instead of 0.7 g.

d) Example 5 is repeated using 1.2 g of 2-anilinoacridone instead of 0.7 g.

Each of the resulting pigments is a complete solid solution with the x-ray pattern of quinacridonequinone.

Example 8 a) Example 7a is repeated except 0.6 g of 5,6,7,8-tetrahydro-2-anilinoacridone is used instead of 2-anilinoacridone.

b) Example 7b is repeated except 0.8 g of 5,6,7,8-tetrahydro-2-anilinoacridone is used instead of 2-anilinoacridone.

c) Example 7c is repeated except 1.0 g of 5,6,7,8-tetrahydro-2-anilinoacridone is used instead of 2-anilinoacridone.

d) Example 7d is repeated except 1.2 g of 5,6,7,8-tetrahydro-2-anilinoacridone is used instead of 2-anilinoacridone.

The solid solution pigments have excellent color saturation and mill-base viscosity in a high solids paint system.

Example 9

Example 4 is repeated except that the milling duration is only 24 hours instead of 48 hours and the following amounts of the components are used.

| | |
|---|---|
| 2-anilinoacridone | 0.6 g |
| DPP | 4.0 g |
| quinacridonequinone | 6.0 g |

The resulting pigment is a mixture of a solid solution with the quinacridonequinone x-ray pattern and an excess of DPP that does not enter into solid solution.

Example 10 a) Example 7a is repeated except 0.6 g of 5,6,7,8-tetrahydro-2-phenoxyacridone is used instead of 2-anilinoacridone.

b) Example 7b is repeated except 0.8 g of 5,6,7,8-tetrahydro-2-phenoxyacridone is used instead of 2-anilinoacridone.

c) Example 7c is repeated except 1.0 g of 5,6,7,8-tetrahydro-2-phenoxyacridone is used instead of 2-anilinoacridone.

d) Example 7d is repeated except 1.2 g of 5,6,7,8-tetrahydro-2-phenoxyacridone is used instead of 2-anilinoacridone.

A solid solution pigment with good fastness is obtained in each case.

Example 11 a) Example 7a is repeated except 0.6 g of 5,6,7,8-tetrahydro-2-phenoxyacridone is used instead of 2-anilinoacridone.

b) Example 7b is repeated except 0.8 g of 5,6,7,8-tetrahydro-2-phenoxyacridone is used instead of 2-anilinoacridone.

c) Example 7c is repeated except 1.0 g of 5,6,7,8-tetrahydro-2-phenoxyacridone is used instead of 2-anilinoacridone.

d) Example 7d is repeated except 1.2 g of 5,6,7,8-tetrahydro-2-phenoxyacridone is used instead of 2-anilinoacridone.

A solid solution pigment with good fastness is obtained in each case.

Example 12

Pigment Dispersion (a) A pint jar is charged with 26.4 g of the pigment composition of Example 5, 66.0 g of an acrylourethane resin, 14.4 g of a dispersant resin and 58.2 g of a solvent (thinner). The mixture is milled using 980 g of grinding media for 64 hours to prepare a pigment base containing 16% pigment and 48% solids at a pigment to binder ratio of 0.5.

Aluminum Base

An aluminum base is obtained by mixing 405 g of aluminum paste (SPARKLE SILVER 5242-AR from SILBERLINE) with 315 g of acrylic dispersion resin and 180 g of acrylic resin in a quart can with an air mixer at slow to medium speed until lump-free (1–2 hrs.).

Metallic Clear Solution

A non-aqueous dispersion resin (1353 g), melamine resin (786.2 g), xylene (144.6 g), a UV screener solution (65.6 g) and acrylourethane resin (471.6 g), are added in the order given and mixed thoroughly with an air mixer for 15 minutes. 89.0 g of a premixed solution of an acid catalyst and 90.0 g methanol are added with continued mixing.

Metallic Paint Formulation

A basecoat paint consisting of 7.1% pigment and 54.4% solids with a pigment to binder ratio of 0.15 is prepared by mixing 35.5 g of the pigment dispersion, 5.1 g aluminum base, 5.3 g nonaqueous dispersion resin and 54.1 g metallic clear solution.

Aluminum panels treated with grey acrylic primer are sprayed with two coats of the basecoat paint to a film thickness of 15–20 microns on a dry film basis. The two sprayings were spaced by a 90 second flash at room temperature. After a flash of 3 minutes, an acrylic clear topcoat is applied by spraying two coats (90 second flash between coats) to a film thickness of 37–50 microns on a dry film basis. The panels are dried for 10 minutes at room temperature and baked at 120° C. for 30 minutes.

The coating is an attractive orange color with excellent two-tone effect and good lightfastness. Similar coatings are obtained when the pigments of Examples 6(a)–(c), 8(a)–(d), 9, 10(a)–(d) and 11(a)–(d) replace the pigment of Example 5.

Example 13

Pigment Dispersion

A 100 ml attritor with 1300 grams of ceramic media is charged with 45.5 grams of the pigment composition of Example 5, 45.5 grams of acrylic resin and 259.0 grams of deionized water. The formulation is stirred at 500 rpm for 20 hours to yield a pigment dispersion containing 13% pigment and 26% solids at a pigment to binder ratio of 0.5.

Aluminum Base 40.0 grams of aluminum paste, 10.0 grams of melamine resin and 50.0 grams of butyl cellosolve are mixed until lump free.

Basecoat Paint Formulation

A basecoat paint is prepared by mixing 46.3 grams of the pigment dispersion, 4.3 grams of the aluminum base and a combination of 56.7 grams of a balancing clear and 45.8 grams of a compensating clear, which are mixtures of acrylic and melamine resins. The formulation corresponds to a pigment to binder ratio of 0.25.

Aluminum panels, which are pretreated with a grey acrylic primer, are sprayed with the basecoat paint to an acceptable level of hiding. The basecoat is air dried for 30 minutes and then dried at 106° C. for 15 minutes before clear coating. Two coats of clearcoat are then applied and air dried for 60 minutes before baking at 122° C. for 30 minutes.

The coating exhibits has an attractive, intense color with excellent two-tone, high gloss and distinctness of image. Similar coatings are obtained when the pigments of Examples 6(a)–(c), 8(a)–(d), 9, 10(a)–(d) and 11(a)–(d) replace the pigment of Example 5.

In addition to the embodiments described above, numerous variations of these embodiments can be made in accordance with this invention.

We claim:

1. A ternary solid solution consisting of from 50 to 97 weight-percent of a quinacridonequinone component, from 2 to 30 weight-percent of a pyrrolo[3,4-c]pyrrole component and from 1 to 20 weight-percent of a third component which is a 2-anilinoacridone, a 5,6,7,8-tetrahydro-2-anilinoacridone, 2-phenoxyacridone, a 5,6,7,8-tetrahydro-2-phenoxyacridone or a mixture thereof; wherein the quinacridonequinone component is a compound of the formula

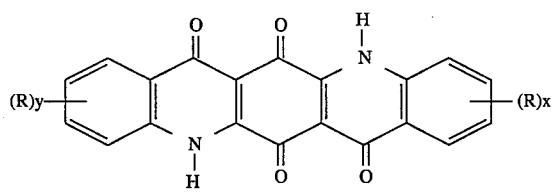

in which R is hydrogen, halogen, or $C_1$–$C_4$alkyl, and x and y are independently 1 or 2, the pyrrolo[3,4-c]pyrrole component is a compound of the formula

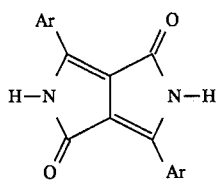

in which each Ar is independently an aryl substituent of the formula

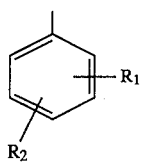

wherein $R_1$ and $R_2$ are independently of each other hydrogen, halogen, $C_1$–$C_5$-alkyl, $C_1$–$C_5$-alkoxy, —$SR_3$, —$N(C_1$–$C_5$alkyl$)_2$, —$CF_3$, —CN or a substituent of the formula

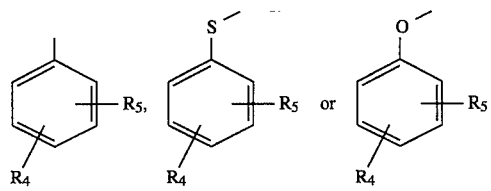

wherein $R_3$ is $C_1$–$C_5$alkyl and $R_4$ and $R_5$ are independently of each other hydrogen, halogen, $C_1$–$C_5$-alkyl, $C_1$–$C_5$-alkoxy, —$SR_3$ or —CN, wherein $R_3$ is $C_1$–$C_5$alkyl; and wherein the third component is a compound of the formula

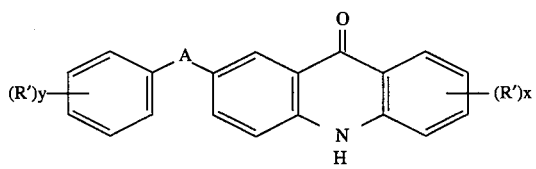

or a compound of the formula

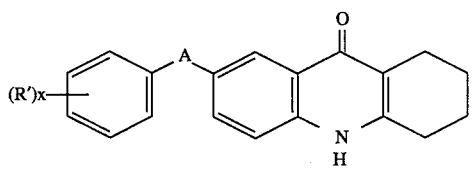

wherein A is O or NH and R' is hydrogen, halogen or $C_1$–$C_4$alkyl.

2. A solid solution of claim 1 wherein the third component is a compound of the formula

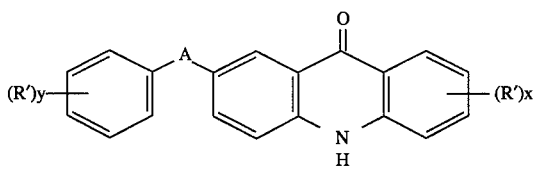

wherein A is NH.

3. A solid solution of claim 2 wherein each R' is hydrogen.

4. A solid solution of claim 3 wherein R is hydrogen, chlorine or methyl.

5. A solid solution of claim 4 wherein $R_1$ and $R_2$ are hydrogen or chlorine.

6. A solid solution of claim 5 wherein the ternary solid solution consists of unsubstituted quinacridonequinone, 1,4-diketo-3,6-diphenylpyrrolo-[3,4-c]-pyrrole and 2-anilinoacridone.

7. A solid solution of claim 1 wherein the third component is a compound of the formula

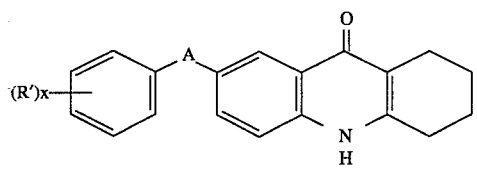

wherein A is NH.

8. A solid solution of claim 7 wherein R' is hydrogen.

9. A solid solution of claim 8 wherein R is hydrogen, chlorine or methyl.

10. A solid solution of claim 9 wherein $R_1$ and $R_2$ are hydrogen or chorine.

11. A solid solution of claim 10 wherein the ternary solid solution consists of unsubstituted quinacridonequinone, 1,4-diketo-3,6-diphenylpyrrolo-[3,4-c]-pyrrole and 5,6,7,8-tetrahydro-2 -anilinoacridone.

12. A solid solution of claim 1 wherein A is O, R' is hydrogen, R is hydrogen, chlorine or methyl and $R_1$ and $R_2$ are hydrogen or chlorine.

13. A solid solution of claim 1 which has the X-ray diffraction pattern of the quinacridonequinone component.

14. A solid solution of claim 1 which consists of from 65 to 80 weight-percent of the quinacridonequinone component and from 10 to 25 weight-percent of the pyrrolo[3,4-c] pyrrole component; the remainder being the third component.

15. A solid solution of claim 1, which consists of from 70 to 80 weight-percent of the quinacridonequinone component and from 15 to 20 weight-percent of the pyrrolo[3,4-c] pyrrole component; the remainder being the third component.

16. A solid solution of claim 1, which consists of from 74 to 78 weight-percent of the quinacridonequinone component and from 18.5 to 19.5 weight-percent of the pyrrolo[3,4-c] pyrrole component; the remainder being the third component.

17. A pigment composition which comprises a solid solution of claim 1.

18. A pigment composition of claim 17 which comprises an excess of the pyrrolo[3,4-c]pyrrole component.

19. A quaternary solid solution consisting of from 40 to 96 weight-percent of a quinacridonequinone component, from 1 to 45 weight-percent of a quinacridone component, from 2 to 30 weight-percent of a pyrrolo[3,4-c]pyrrole component and from 1 to 20 weight-percent of an acridone component which is a 2-anilinoacridone, a 5,6,7,8-tetrahydro-2-anilinoacridone, 2-phenoxyacridone, a 5,6,7,8-tetrahydro-2-phenoxyacridone or a mixture thereof; wherein the quinacridonequinone component is a compound of the formula

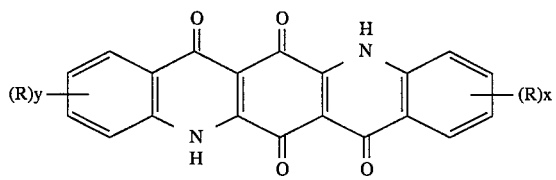

in which R is hydrogen, halogen, or $C_1$–$C_4$alkyl, and x and y are independently 1 or 2; the quinacridone component is a compound of the formula

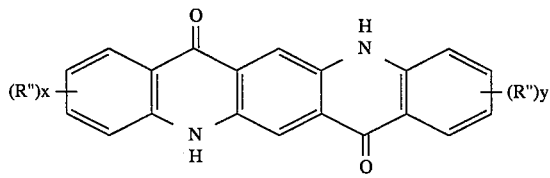

wherein each R" is independently hydrogen, halogen, $C_1$–$C_4$alkyl or trifluoromethyl; the pyrrolo[3,4-c]pyrrole component is a compound of the formula

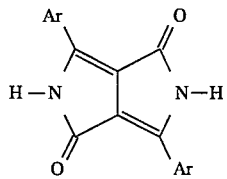

in which each Ar is independently an aryl substituent of the formula

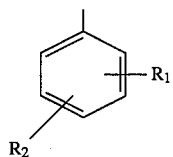

wherein $R_1$ and $R_2$ are independently of each other hydrogen, halogen, $C_1$–$C_5$-alkyl, $C_1$–$C_5$-alkoxy, —$SR_3$, —$N(C_1$–$C_5$alkyl$)_2$, —$CF_3$, —CN or a substituent of the formula

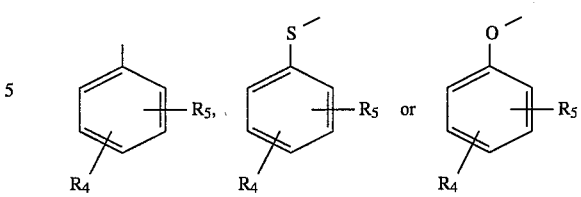

wherein $R_3$ is $C_1$–$C_5$alkyl and $R_4$ and $R_5$ are independently of each other hydrogen, halogen, $C_1$–$C_5$-alkyl, $C_1$–$C_5$-alkoxy, —$SR_3$ or —CN, wherein $R_3$ is $C_1$–$C_5$alkyl; and wherein the acridone component is a compound of the formula

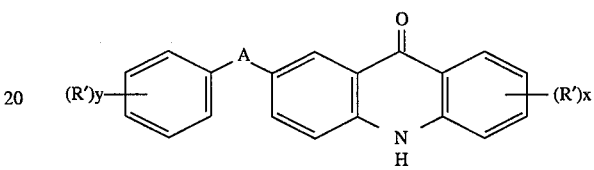

or a compound of the formula

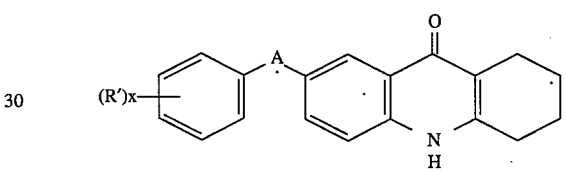

wherein A is O or NH and R' is hydrogen, halogen or $C_1$–$C_4$alkyl.

20. A pigment composition which comprises a quaternary solid solution of claim 19.

21. A method of coloring a high molecular weight organic material which comprises incorporating an effective pigmenting amount of a ternary solid solution of claim 1 into said high molecular weight organic material.

22. A quaternary solid solution according to claim 19 wherein A is NH.

23. A quaternary solid solution of claim 19 which consists of 40 to 50 weight-percent of the quinacridonequinone component, 30 to 40 weight-percent of the quinacridone component, 10 to 20 weight percent of the pyrrolo[3,4-c]pyrrole component, the remainder being the acridone component.

24. A quaternary solid solution of claim 19 wherein each R is hydrogen, chlorine or methyl, each R" is hydrogen or chlorine, $R_1$ and $R_2$ are each hydrogen and each R' is hydrogen.

25. A quaternary solid solution of claim 24 wherein each R is hydrogen and each R" is hydrogen.

26. A quaternary solid solution of claim 19 which has the x-ray diffraction pattern of the quinacridonequinone component.

27. A method of coloring a high molecular weight organic material which comprises incorporating an effective pigmenting amount of a quaternary solid solution of claim 19 into said high molecular weight organic material.

* * * * *